United States Patent [19]

Mechnick

[11] 4,303,333

[45] Dec. 1, 1981

[54] PHOTOGRAPHIC PRINTING DEVICE

[76] Inventor: William R. Mechnick, Chemin Des Prelets, 1027 Lonay, Switzerland

[21] Appl. No.: 76,820

[22] Filed: Sep. 19, 1979

[51] Int. Cl.³ ........................ G03B 27/32; G03B 27/52
[52] U.S. Cl. ..................................... 355/27; 354/83;
   355/32; 355/39; 355/45; 355/67
[58] Field of Search ........................ 355/18, 27, 32, 39,
   355/44, 45, 67; 354/83

[56] References Cited

U.S. PATENT DOCUMENTS

| | | |
|---|---|---|
| 803,385 | 10/1905 | Wynne . |
| 2,180,007 | 11/1939 | Hopkins . |
| 2,202,353 | 5/1940 | Morgan . |
| 3,060,796 | 10/1962 | Muse, Jr. ........................ 355/39 X |
| 3,065,667 | 11/1962 | Edgerton ........................ 355/27 |
| 3,295,425 | 1/1967 | Bing et al. . |
| 3,330,193 | 7/1967 | Kaess . |
| 3,453,943 | 7/1969 | Newcomb . |
| 3,479,937 | 11/1969 | Sullivan . |
| 3,525,293 | 8/1970 | Harvey . |
| 3,653,760 | 4/1972 | Johnson ........................ 355/39 |
| 3,689,148 | 9/1972 | Black ........................ 355/18 |
| 3,697,175 | 10/1972 | Sullivan ........................ 355/39 |
| 4,026,651 | 5/1977 | Vitou ........................ 355/44 |
| 4,076,413 | 2/1978 | Smeaton ........................ 355/32 |
| 4,114,166 | 9/1978 | Driscoll et al. ........................ 354/864 |
| 4,184,763 | 1/1980 | Handsman et al. ........................ 355/27 |

FOREIGN PATENT DOCUMENTS

598614 11/1977 Switzerland .

*Primary Examiner*—Richard A. Wintercorn
*Attorney, Agent, or Firm*—Ronald G. Goebel

[57] ABSTRACT

A device for producing photographic prints on a printing medium such as an instant developing film pack from a transparency is provided comprising a housing having an image forming chamber in the forward section thereof containing a lens, a flash tube, opalescent glass plate and a slide holder. A holder for the film pack is located in a rear light-tight chamber formed in the housing and a mirror is located at the bottom of the light-tight chamber angled so as to reflect the image formed in the image forming chamber onto the film pack.

21 Claims, 4 Drawing Figures

PHOTOGRAPHIC PRINTING DEVICE

BACKGROUND OF THE INVENTION

This invention is concerned with a device for producing photographic prints from transparencies such as slides, preferably employing an instant film pack as the printing medium.

In the past, a number of devices have been described for producing photographic productions or prints from black and white negatives and slides. For example, in my prior Swiss Pat. No. 598,614, patented Nov. 15, 1978, a slide printer is provided comprising a housing having a front panel and a rectangular opening at the raised section forward of the panel. A ground glass covers the opening and thereover is fitted an instant film pack. A dark compartment is located in the housing beneath the glass containing an angled mirror and a lens. Knobs external to the housing for adjusting lens aperture and telescoping are linked to the lens. Another compartment is located beneath the panel which houses a light source at one side bounded by two reflecting mirrors. A third mirror is located to the side of the light source and is angled to reflect light toward the lens. Between the angled mirror and the lens is, in order, a diffuser, a filter and a slide, each removably retained in holders.

One disadvantage of the device of my prior Swiss patent was that the light source used therein comprised a quartz light which did not match the Kelvin rating of the instant film contained in the film pack. Such films, as currently manufactured have a daylight Kelvin rating of about 5400 Kelvin. Quartz lights, have a Kelvin rating of about 3400 Kelvins so it is necessary to use filters in such device to increase the Kelvin rating to match the rating of the film. Moreover, quartz lights develop significant amounts of heat, need to be exposed for longer periods of time to produce a satisfactory print and often cause buckling of the transparency.

In U.S. Pat. No. 3,065,667 to H. E. Edgerton an apparatus for making enlarged prints from transparencies or slides is described. The apparatus comprises a light-tight housing having at the top a processing head which can be a self-developing "Polaroid" camera with its film portion facing inwardly of the housing. The slide is placed in a holder beneath which is a light source such as a flash unit. A lens whose aperture may be controlled by a diaphragm is located between the slide and film and focuses an enlarged image on the film. Other printing devices have been described in the art which employ a camera as the medium for production of the photographic image. Such devices have been described in U.S. Pat. Nos. 4,076,413; 3,689,148; 3,454,943; 3,697,175 and 3,653,760.

The present invention is an improvement over my prior Swiss patent and is characterized by a more efficient and simpler design, that is, it does not contain a plurality of light reflecting mirrors or lens telescoping means. Moreover, the present invention employs the use of a flash unit having a Kelvin rating which matches the daylight rating of the instant film. In order to break up the contrast of the print an opalescent glass or opalescent plexiglass plate is employed between the flash unit and the instant film pack. Without such plate the contrast of the print would be too high. The plate acts to produce a soft print on the instant film.

SUMMARY OF THE INVENTION

The present invention provides a device for producing photographic prints on a printing medium from a transparency such as a slide or negative. The device preferably employs the use of an instant developing film pack as the printing medium but can also employ other paper printing media for producing both colored or black and white prints.

The device comprises a housing having a bottom, a forward section, an intermediate section and a rear section. A holder for an instant film pack is located in the rear section comprising a flat face on which the film pack rests having a rectangular aperture which registers with the printing paper or material of the pack and defines the size of the image. The aperture is covered by a ground glass plate. Means for retaining the film pack are mounted on the holder comprising L-shaped members extending upwardly from the face defining guide channels through which the side edges of the pack are inserted. Spring means are provided in the channels to retain the pack in place in the holder. The lower portion of the holder comprises a walled, boxlike section comprised of or coated with a light absorbtive material which extends into the rear section to form a light-tight compartment. A reflecting mirror is mounted in this compartment at an angle of about 45° with respect to the bottom. Extending from the front to the intermediate sections of the housing is a longitudinal housing defining an image forming chamber. The image forming chamber contains a source of illumination such as a flash tube, an opalescent glass plate or opalescent plexiglass plate located rearward of the tube, and a slide and filter chamber located rearward of the opalescent plate for insertion of a slide transparency and filter. A lens assembly extends from the rearward end of the image forming chamber into the light-tight compartment through an opening in the holder wall. The lens assembly preferably comprises a 50 mm lens and an aperture adjustment annulus to enable sharpening of the image to the film pack. The annulus is connected by linking means to a knob in the housing's intermediate section for remote lens adjustment.

The device is electrically operated by means of 110 or 220 V or battery. A pulse generator is connected with the power source and flash tube and is activated by a flash button located on the housing front section. A timer may also be present to time the exposure of the flash.

DETAILED DESCRIPTION OF THE PREFERRED EMBODIMENTS

Figure 1:
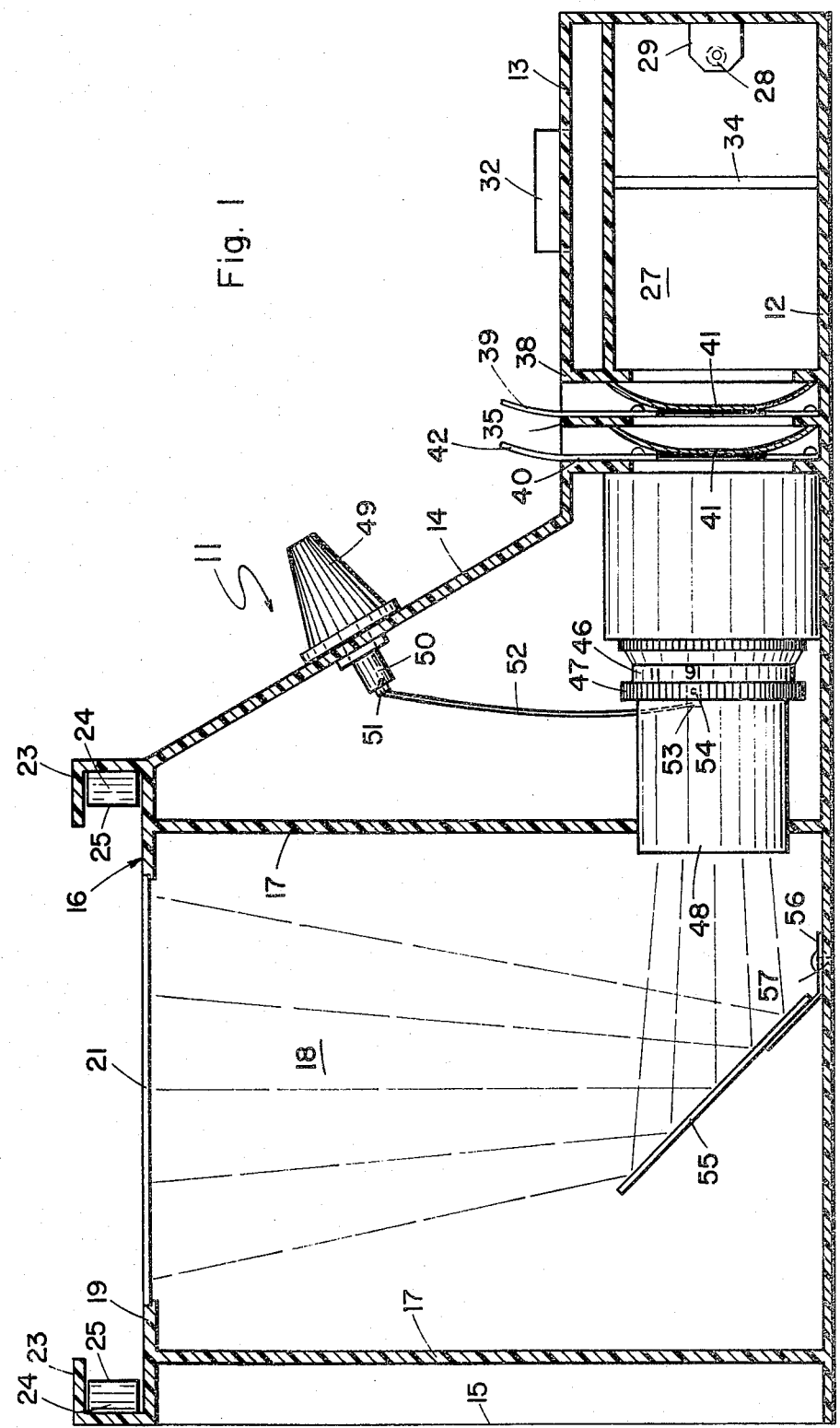
FIGS. 1 & 2 show a side view and top view, respectively, of the printer of this invention.
Figure 2:
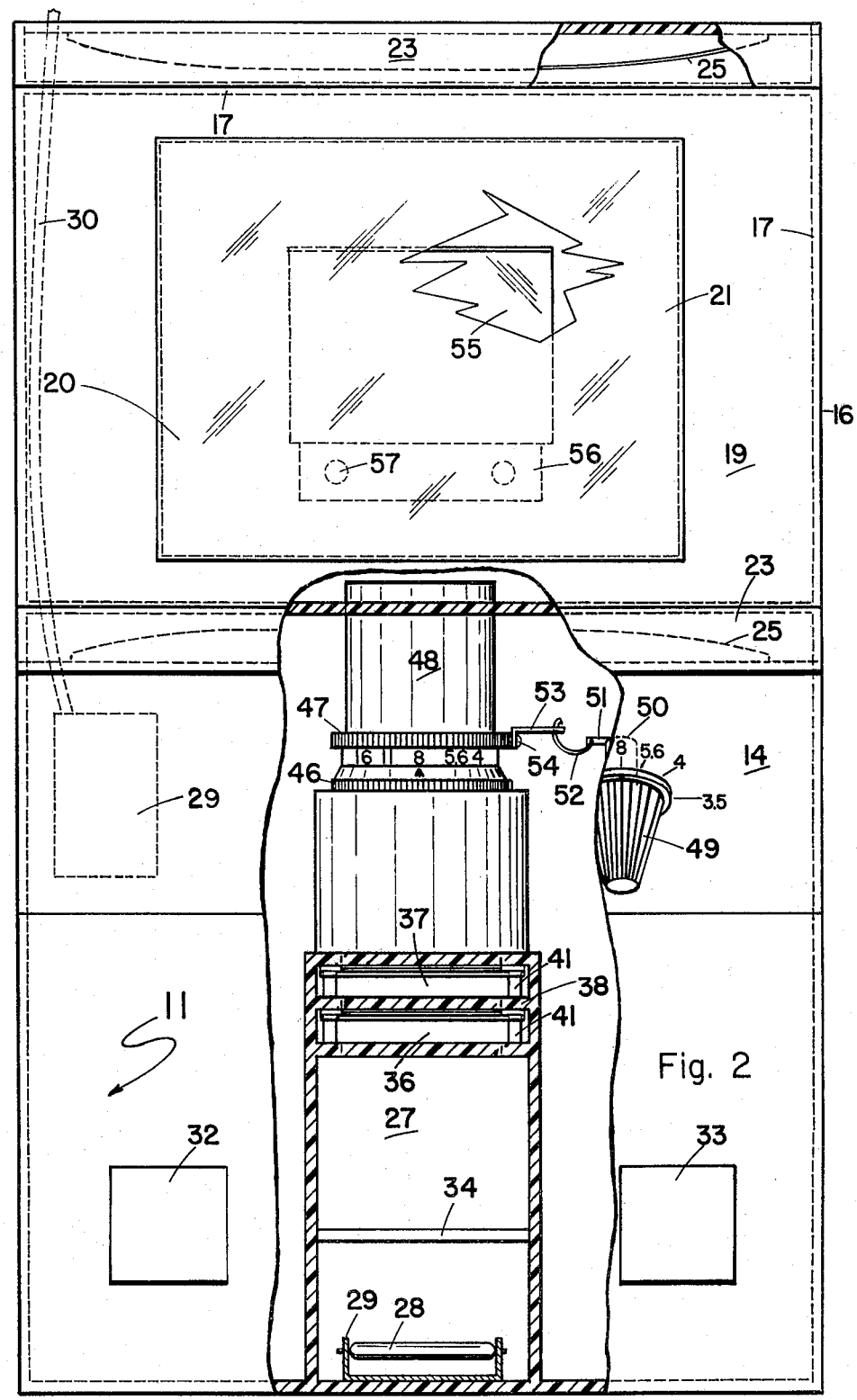

FIGS. 1 & 2 show a side view and top view, respectively, of the slide printer of this invention which is useful for producing colored or black and white prints on a printing medium from photographic transparencies such as slides. The printer is particularly useful for printing colored slides by employing a self-developing or instant film pack associated with the printer. The printer may also be used to produce black and white prints on conventional photographic printing paper from black and white negatives. It may also be used to produce black and white negatives.

Figure 3:
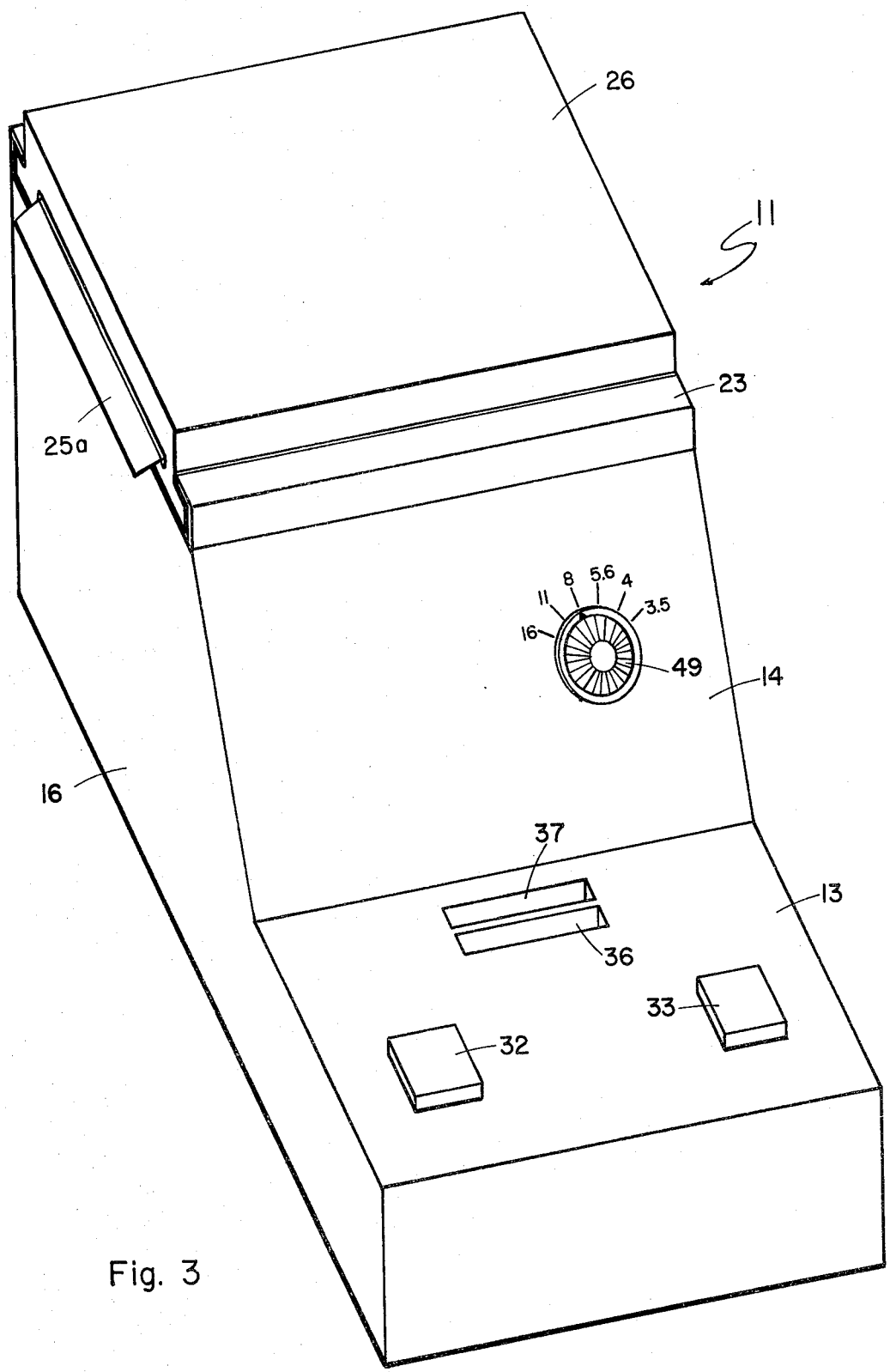
FIG. 3 is a perspective view of the printer of FIGS. 1 & 2 having an instant film pack mounted thereon.

The printer comprises a hollow housing 11 having the configuration shown consisting of a base section 12, forward section 13, upwardly extending intermediate section 14 and rear section 15. Mounted atop the rear section 15 is holder 16 which retains an instant color film pack such as those manufactured and sold by the Polaroid Corporation or the Eastman Kodak Company. Such film packs having heretofore been used in self developing cameras for instantly producing colored prints as well as known in the art. Such films generally have a daylight rating of about 5400 Kelvin. The bottom of the holder 16 comprises a box-like section bounded by walls 17 made of or coated with a light absorbing material which extends into the rear section 15 of the housing 11 to form a light-tight compartment 18. The face 19 of the holder comprises a flat metal plate having rectangular opening 20 which meets the formatt of the instant developing film pack. A section of glass 21 overlies the opening. Extending above the face 19 of the holder on opposite sides thereof are a pair of L-shaped members 23 which form guide channels 24 into which the ends of the film pack are inserted. A pair of leaf springs 25 are fastened to the L-shaped members at each end to retain the film pack in the holder after insertion. FIG. 3 shows a film pack 26 set in place in the holder. Extending from the forward to the intermediate sections of the housing is a longitudinal housing 27a defining image forming chamber 27. Mounted at the forward end of this chamber is a source of illumination such as a flash tube 28 held in bracket 29. It is preferred that this tube be mounted horizontally in the chamber as shown to provide even illumination across the transparency. The tube 28 is connected by appropriate wiring to a pulse generating circuit board 29 which is supplied by external voltage through power lines 30. The source of power for the printer may be conventional 110 or 220 V AC using socket connector 31 or a battery (not shown). On-Off button 32 is used to switch power on and off to the circuitry and flash button 33 is used to initiate an electronic pulse to the flash tube from the pulse generator circuit. The design of such circuitry is well known in the art and will not be described herein. Forward of the flash tube is an opalescent glass plate 34 whose purpose is to break down the contrast of the image projected on the film pack as previously mentioned. A filter and slide holder assembly 35 is located ahead of the opalescent plate 34 which comprises a filter chamber 36 and slide chamber 37 extending vertically from the bottom section 12 through the face of section 13 to permit access to each chamber through the top of section 13. The chambers are bounded on two opposing sides by a pair of longitudinal E-shaped members 38. Filter holder 39 and slide holder 40 fit within chamber 36 and 37 along the channels formed by the E-shaped member. A pair of leaf springs 41 are located against the forward inner wall of the E-shaped members to retain the slide and filters in their respective channels. A tab 42 in each holder allows the user of the device to remove and insert each holder from the forward section.

Figure 4:
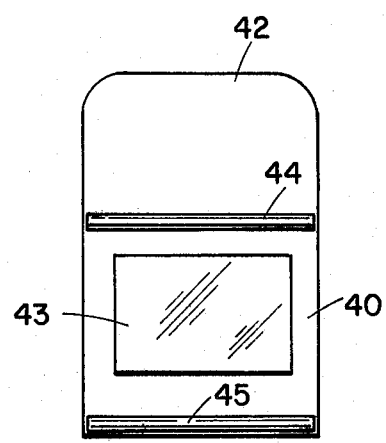
FIG. 4 shows a front view of a holder useful in the printer for holding a slide or filter.

FIG. 4 is a front view of a slide holder 40 which is identical to filter holder 39. The holder has a rectangular opening equal to the size of the image on the slide. An upper ledge 44 and lower ledge 45 are formed in the holder above and below the opening 43 between which is nested the cardboard mounting of a slide or other transparency.

Mounted at the forward end of chamber 27 is a 50 mm lens assembly 46 having aperture adjustment annulus 47. A light-tight lens cover 48 fits over the lens assembly and extends into light-tight compartment 18 through an aperture in wall 17 of housing 16.

A lens aperture adjustment knob 49 is located on the face of the intermediate section 14. An extension 50 of the knob 49 protrudes into section 14 having an apertured pin 51 fastened thereto at a right angle to the knob. One end of a linking wire 52 is connected to pin 51 at its aperture and the other end is connected to apertured pin 52 mounted on bracket 54 which in turn fastened to annulus 47 by bracket 54 by means of a screw fastener. Movement of the knob 49 in a clockwise or counterclockwise direction will, by means of the linking wire, affect a corresonding movement of the lens annulus 47 so that external lens aperture adjustment can be precisely adjusted to control the quality of the print.

A reflecting mirror 55 is fastened to the bottom section of the housing by means of brackets 56 and screw fasteners 57. The mirror is set at an angle of about 45° from the horizontal and acts to project the image from the lens onto the film pack nested in the holder.

Operation of the printer of this invention is as follows. The instant film pack 26 is first inserted into the holder 16 as shown in FIG. 3. Power is turned on by pushing the On-Off button 32. The lens aperture adjustment knob 49 is then set, usually to f/11 for normally exposed slides. After inserting a slide in its holder it is placed in the slide chamber 37. To expose the instant film in the pack a safety cover on the right side of the film pack and a flexible slide on the left side of the film pack are removed. The flash button is depressed to make the exposure and thereafter the white tab 25a on the film pack is pulled outwardly exposing a yellow tab (not shown). The yellow tab is pulled out and the exposure timed for development. For this purpose an electric timer may also be associated with the machine. After timing a print is separated from the negative as per the instructions on the film pack.

Alternatively, a black and white negative may be inserted in the slide holder instead of a slide and conventional photographic print paper may be substituted for the film pack to produce a standard black and white print.

It should further be emphasized that, unlike the device of my prior Swiss patent which used a quartz lamp, the present invention provides a flash unit which matches the daylight Kelvin requirements of the instant film, i.e. about 5400° K. In order to break down the undesirable high contrast of the print after exposure which would normally result, the opalescent glass or plexiglass plate is employed which produces a softer print having even tone color saturation. Filters are used with the slide in this invention not to increase the Kelvin rating of the slide as must be done according to the device of my prior Swiss patent, but to allow the operator to merely alter the colors or hues on the slide to be printed. Without filterization, the present device prints exactly what is present in the slide.

I claim:

1. A device for producing photographic prints from a transparency on a printing medium having a daylight film rating comprising:

(a) a housing having an image forming chamber and a substantially light-tight compartment located adjacent said chamber, said compartment having an aperture extending through said housing for allowing an image to be printed on said printing medium;
(b) a lens extending from said image-forming chamber to said light-tight compartment;
(c) a reflecting mirror positioned in said light-tight compartment for reflecting an image from said lens to said aperture;
(d) a source of illumination located in said image-forming chamber, said source having a Kelvin rating which matches the daylight rating of said printing medium;
(e) an opalescent plate located in said chamber adjacent said illuminating source; and
(f) means located in said chamber adjacent said opalescent plate for holding a transparency.

2. The device of claim 1 which further comprises a filter holder located in said image forming chamber between said illumination source and said transparency.

3. The device of claim 1 wherein said lens further comprises an aperture adjusting annulus.

4. The device of claim 3 wherein a lens aperture adjustment knob is located on said housing, said knob being linked with said lens aperture adjusting annulus.

5. The device of claim 1 wherein said printing medium is an instant developing film pack located above said aperture.

6. The device of claim 1 wherein said transparency is a slide.

7. The device of claim 1 wherein said transparency is a negative.

8. A device for producing photographic prints from a transparency on an instant developing film pack having a printing medium contained therein, said printing medium having a daylight film rating, said device comprising:
(a) a housing having a bottom, a forward section, an intermediate section and a rear section;
(b) a holder for said instant film pack located on said rear section; said holder comprising a face section on which said pack rests; said face section having an aperture registering with the printing medium of said pack for allowing an image to be printed on said material, and means for retaining said pack in said holder, said holder forming a light-tight compartment in said rear section when said film pack is retained therein;
(c) a longitudinal housing defining an image forming chamber extending from said forward section to said intermediate section;
(d) a lens extending from said image forming chamber to said light-tight chamber, said lens having an aperture adjusting annulus;
(e) a lens aperture adjusting knob mounted on said housing at said intermediate section;
(f) means linking said annulus and said knob for remotely adjusting said lens aperture;
(g) a reflecting mirror positioned in said light-tight compartment for reflecting an image to said aperture;
(h) a flash tube located in said image forming chamber at said forward section; said tube having a rating matching said daylight film rating of said printing medium;
(i) means for energizing said flash tube;
(j) an opalescent plate located in said image forming chamber adjacent said flash tube; and
(k) means located in said image forming chamber adjacent said opalescent plate for holding a transparency.

9. The device of claim 8 wherein said mirror is positioned at an angle of 45° with respect to said bottom.

10. The device of claim 8 which further comprises a filter located between said opalescent plate and said transparency.

11. The device of claim 8 wherein said transparency is a slide.

12. A device for producing photographic prints from a transparency on an instant developing film pack having a printing medium contained therein, said printing medium having a daylight film rating, said device comprising:
(a) a housing having an image forming chamber and a substantially light-tight compartment located adjacent said chamber, said compartment having an aperture extending through said housing for allowing an image to be printed on said printing medium;
(b) a lens extending from said image forming chamber to said light-tight compartment;
(c) a reflecting mirror positioned in said light-tight compartment for reflecting an image from said lens to said aperture;
(d) a flash tube located in said image forming chamber, said tube having a Kelvin rating which matches the daylight rating of said printing medium;
(e) an opalescent plate located in said chamber adjacent said flash tube; and
(f) means for holding a photographic transparency located in said chamber adjacent said opalescent plate.

13. The device of claim 12 which further comprises a filter holder located in said image forming chamber between said flash tube and said transparency.

14. The device of claim 12 wherein said lens has a focal length of 50 mm.

15. The device of claim 12 wherein said lens further comprises an aperture adjusting annulus.

16. The device of claim 15 wherein a lens aperture adjustment knob is located on said housing, said knob being linked with said lens adjusting annulus.

17. A device for producing colored photographic prints from a slide transparency on an instant developing film pack having a printing medium contained therein, said printing medium having a daylight film rating, said device comprising:
(a) a housing having a bottom, a forward section, an intermediate section and a rear section;
(b) a holder for said instant film pack located atop said rear section; said holder comprising a face section on which said pack rests; said face section having an aperture registering with the printing medium of said pack for allowing an image to be printed on said medium, means for retaining said pack in said holder; said holder forming a light-tight compartment in said rear section when said film pack is retained in said holder;
(c) a longitudinal housing defining an image forming chamber extending from said forward section to said intermediate section;
(d) a 50 mm lens extending from said image forming chamber to said light-tight chamber, said lens having an aperture adjusting annulus;

(e) a lens aperture adjusting knob mounted on said housing at said intermediate section;
(f) means linking said annulus and said knob for remotely adjusting said lens aperture;
(g) a reflecting mirror positioned in said light-tight compartment for reflecting an image to said printing medium;
(h) a flash tube located in said image forming chamber at said forward section, said tube having a Kelvin rating matching the daylight film rating of said printing medium;
(i) means for energizing said flash tube;
(j) an opalescent plate located in said image forming chamber adjacent said flash tube; and
(k) means located in said image forming chamber adjacent said opalescent plate for holding a slide transparency.

18. The device of claim 17 wherein said mirror is positioned at an angle of 45° with respect to said bottom.

19. The device of claim 17 which further comprises a filter holder located between said opalescent plate and said transparency.

20. The device of claim 1 wherein said lens has a focal length of 50 mm.

21. The device of claim 8 wherein said lens has a focal length of 50 mm.

* * * * *